United States Patent [19]

Zondler et al.

[11] Patent Number: 4,786,268
[45] Date of Patent: Nov. 22, 1988

[54] LIQUID-CRYSTAL DISPLAY MANUFACTURING METHOD

[75] Inventors: Rolf Zondler; Jurgen Pottharst, both of Stuttgart, Fed. Rep. of Germany

[73] Assignee: Standard Elektrik Lorenz AG, Stuttgart, Fed. Rep. of Germany

[21] Appl. No.: 906,115

[22] Filed: Sep. 11, 1986

[30] Foreign Application Priority Data

Sep. 12, 1985 [DE] Fed. Rep. of Germany ..... 35324486

[51] Int. Cl.$^4$ ................................................ G02F 1/13
[52] U.S. Cl. .......................................... 445/25; 427/164
[58] Field of Search ..................... 445/24, 25; 427/162–164, 166; 350/350 R, 344

[56] References Cited

U.S. PATENT DOCUMENTS

| | | | |
|---|---|---|---|
| 4,009,550 | 7/1978 | Matsuzaki et al. | 141/51 |
| 4,094,058 | 6/1978 | Yasutake et al. | 29/592 R |
| 4,181,756 | 1/1980 | Ferguson | 427/108 |
| 4,228,574 | 10/1980 | Culley et al. | 445/25 |
| 4,420,224 | 12/1983 | Kaufmann | 427/162 |
| 4,505,685 | 3/1985 | Tischer et al. | 445/24 |
| 4,605,284 | 8/1986 | Ferguson | 350/344 |

FOREIGN PATENT DOCUMENTS

WO/02915 7/1985 PCT Int'l Appl. .
CH647876 2/1985 Switzerland .

OTHER PUBLICATIONS

IBM Technical Disclosure Bulletin, "Liquid Crystal Cell Filling", vol. 16, No. 2, Jul. 1973, pp. 395–396.

Primary Examiner—Kenneth J. Ramsey
Attorney, Agent, or Firm—Christie, Parker & Hale

[57] ABSTRACT

The introduction of liquid-crystal material into a liquid-crystal cell is simplified by cooling the liquid-crystal material until it has a paste-like viscosity suitable for printing. After a spacer has been positioned on a first substrate, the liquid-crystal material is introduced within the interior portion of the spacer using printing techniques. A second substrate is then placed on the spacer, and the display is sealed.

6 Claims, 1 Drawing Sheet

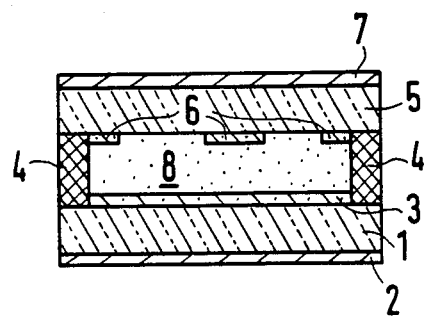

LIQUID-CRYSTAL DISPLAY MANUFACTURING METHOD

FIELD OF THE INVENTION

The present invention relates to a method of manufacturing a liquid-crystal display using printing-like techniques.

BACKGROUND ART

In "IBM Technical Disclosure Bulletin", Vol. 16, No. 2, July 1973, pp. 395 and 396, a liquid-crystal cell is described which encloses liquid-crystal material between two substrates and a spacer frame. The cell has a single hole through which the liquid-crystal material is introduced in a vacuum. To fill the cell, the cell is placed in a container which contains a cup with the liquid-crystal material. The container is evacuated and the portion of the cell where the hole is located is then dipped into the liquid-crystal material. The vacuum is removed and atmospheric pressure forces the liquid-crystal material into the cell. The hole is then hermetically sealed.

SUMMARY OF THE DISCLOSURE

An overall object of the present invention is to provide a method of manufacturing a liquid-crystal display in which the introduction of the liquid-crystal material is simplified.

This object is attained by cooling the liqiud-crystal material until it has a paste-like viscosity suitable for printing. The viscous liquid-crystal material is deposited on a first substrate using printing techniques. A second substrate is then placed over the liquid crystal material and the display is sealed. Preferably, a spacer is positioned on the first substrate prior to the deposite of the viscous liquid-crystal material and the liquid-crystal material is introduced within the interior portion of the spacer.

BRIEF DESCRIPTION OF THE DRAWING

The FIGURE shows a cross section of a liquid crystal cell constructed in accordance with the present invention.

DESCRIPTION OF A PREFERRED EMBODIMENT

A spacer 4 connects a first substrate 1 with a second substrate 5. On the side of the second substrate 5 facing toward the first substrate 1, there is provided a plurality of transparent electrodes 6 whose pattern determines a perceived shape of the displayed image. On its other side (ie, the side facing away from first substrate 1), the second substrate 5 bears a polarizer 7. Liquid crystal material 8 is contained in the space enclosed by the substrates 1 and 5 and the spacer 4.

The substrates 1 and 5 may be made of glass, plastic, or any other suitable material. They can have the dimensions of a liquid-crystal display but may also occupy a larger area on which two or more liquid-crystal displays can be fabricated simultaneously. Furthermore, glass balls or glass-fiber particles (not shown) may be present in the liquid-crystal as spacers. For use with a reflective mode type of liquid crystal display, the polarizing film 2 may be provided with a mirror (not shown); when the cell is used in the transmissive mode, this mirror is not present or is folded away. Except as otherwise described specifically herein, the liquid crystal cell may be conveniently fabricated using conventional materials.

The liquid-crystal display is manufactured as follows:

The spacer 4 is positioned in the suitably prepared first substrate 1. Then, the liquid-crystal material 8 is introduced into the spacer by a printing process. To this end, the liquid-crystal is cooled down until it is pasty, i.e., until it has a viscosity sufficient for printing. Next, the suitably prepared second substrate 5 is placed on the spacer 4, which is then permanently joined to the two substrates 1 and 5, and the display is seated. If the two substrates have not yet been provided with polarizers, this is done now.

To print the cooled liquid-crystal material 8, conventional silk-screen, cylinder, or tampon printing techniques may be used. However, during silk-screen printing, it is advantageous to cool the printing room to maintain the desired viscosity of the liquid crystal material. During cylinder and tampon printing, it is sufficient to cool the cylinder or the printing plate, respectively.

To seal the liquid-crystal display, conventional bonding or soldering techniques are used, depending on the materials of the two substrates and the spacer.

What is claimed is:

1. A method of manufacturing a liquid-crystal display containing liquid-crystal material between two substrates comprising:
    (a) providing a suitably prepared first substrate;
    (b) printing a predetermined two-dimensional pattern of unencapsulated liquid-crystal material having a predetermined temperature onto said first substrate, said predetermined temperature being selected to provide an optimal viscosity for printing;
    (c) covering said liquid-crystal material with a suitably prepared second substrate; and
    (d) sealing the region between said first and second substrates containing said two-dimensional pattern of liquid-crystal material.

2. The method as claimed in claim 1, comprising the additional step of temporarily cooling said liquid-crystal material to said predetermined temperature during said printing step, whereby the viscosity of said liquid-crystal material during normal operation of said display is independent of said optimal viscosity for printing.

3. The method as claimed in claim 2, wherein said printing step is performed by means of a silk screen process in a cooled room.

4. The method as claimed in claim 2 wherein said printing step is performed by means of a cylinder printing process using a cooled printing cylinder.

5. The method as claimed in claim 2 wherein said printing step is performed by means of a tampon process using a cooled printing plate.

6. The method of claim 1, comprising the additional step of providing a spacer on said first substrate prior to said printing step, and wherein said printing step deposits said liquid crystal material within the interior portion of said spacer.

* * * * *

UNITED STATES PATENT AND TRADEMARK OFFICE
CERTIFICATE OF CORRECTION

PATENT NO. : 4,786,268
DATED : November 22, 1988
INVENTOR(S) : Rolf Zondler and Jurgen Pottharst It is certified that error appears in the above-identified patent and that said Letters Patent is hereby corrected as shown below:

In the Specification

| | |
|---|---|
| Colum 1, Line 30 | Change "liqiud-crystal" to -- liquid-crystal -- |
| Column 1, Line 36 | Change "deposite" to -- deposit -- |
| Column 2, Line 5 | Change "conveniently" to -- conventionally -- |

Signed and Sealed this

Eighteenth Day of April, 1989

Attest:

DONALD J. QUIGG

*Attesting Officer*   *Commissioner of Patents and Trademarks*